UNITED STATES PATENT OFFICE.

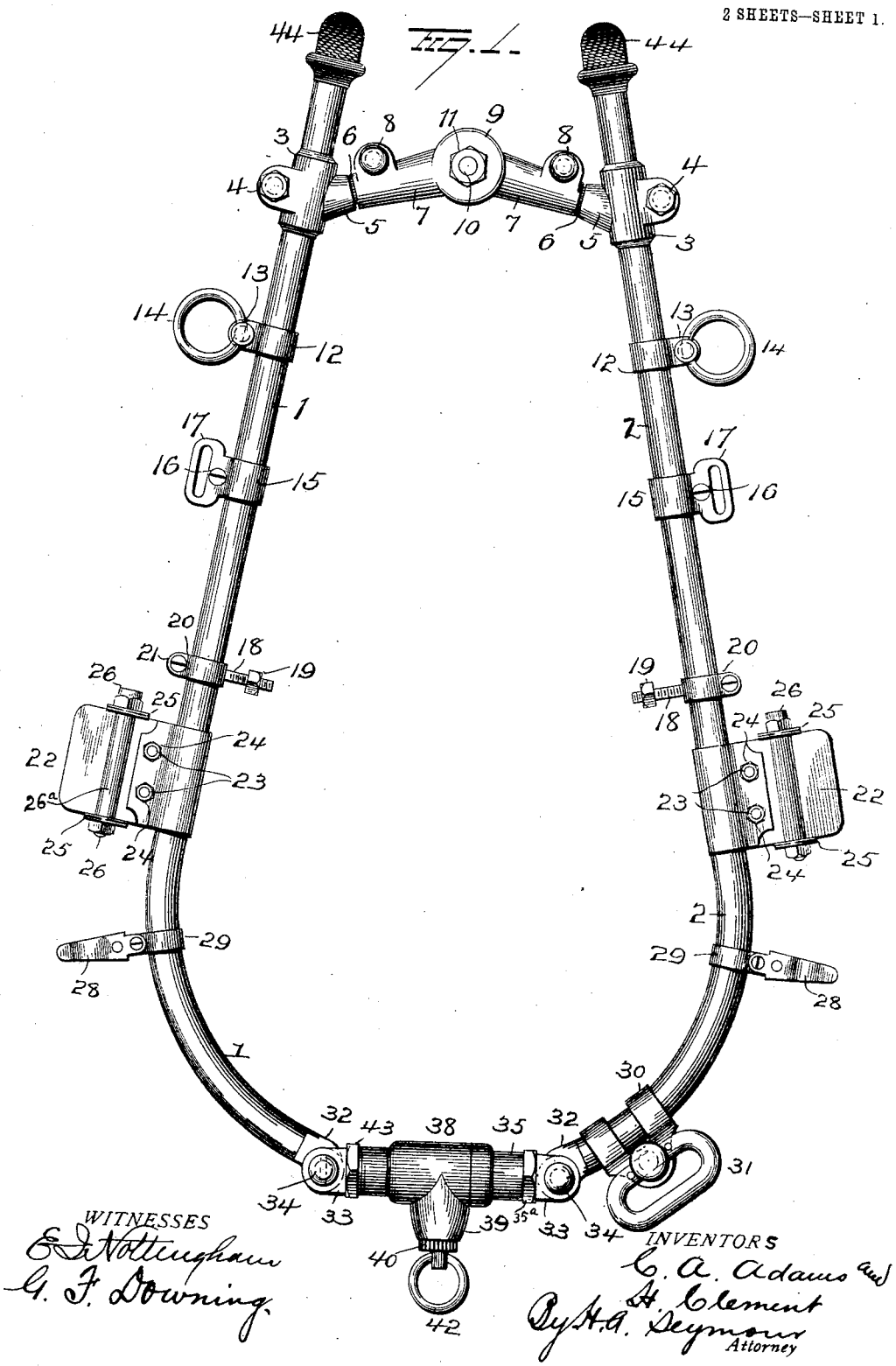

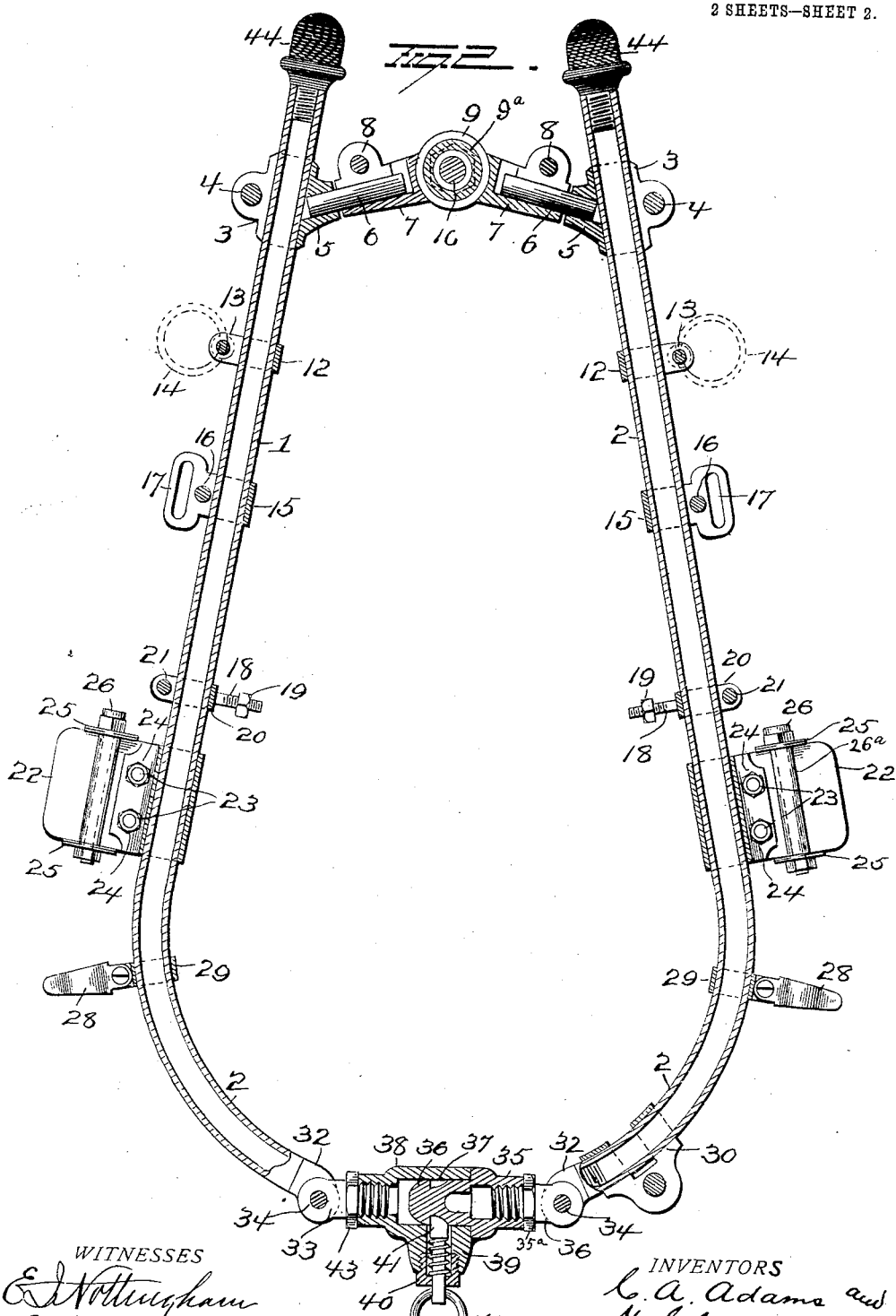

CLARENCE A. ADAMS AND HORACE CLEMENT, OF LINCOLN, NEBRASKA.

HAME.

No. 805,181.  Specification of Letters Patent.  Patented Nov. 21, 1905.

Application filed November 17, 1903. Serial No. 181,546.

*To all whom it may concern:*

Be it known that we, CLARENCE A. ADAMS and HORACE CLEMENT, residents of Lincoln, in the county of Lancaster and State of Nebraska, have invented certain new and useful Improvements in Hames; and we do hereby declare the following to be a full, clear, and exact description of the invention, such as will enable others skilled in the art to which it appertains to make and use the same.

Our invention relates to an improved hame, and more particularly to hames for use on fire-department harness, the object of the invention being to construct our improved hame of tubular metal, which will be exceedingly strong and durable and permit of an almost infinite number of adjustments to fit any animal.

A further object is to provide an improved coupling or locking mechanism which will insure a perfect fastening and permit the ready uncoupling when desired.

With these objects in view the invention consists in certain novel features of construction and combinations and arrangements of parts, as will be more fully hereinafter described, and pointed out in the claims.

In the accompanying drawings, Figure 1 is a view in elevation illustrating our improvements. Fig. 2 is a view in longitudinal section.

1 and 2 represent the two main members, each comprising a continuous metal tube curved to correspond to the shape of a horse's shoulder and neck.

Near the upper ends of the members 1 and 2 clamping-sleeves 3 are adjustably secured by set-screws 4 and are made with integral tubular inclined lugs 5, in which posts or rods 6 are secured, and have sleeves 7 clamped thereon by set-screws 8 and fit snugly against the lugs 5. The free ends of sleeves 7 have integral disks 9, located side by side and having central screw-threaded openings to receive a screw or bolt 10 to pivotally connect the members and permit them to be opened and closed at will. A nut 11 is screwed onto the projecting end of screw or bolt 10 to firmly secure the latter in place, and by adjusting this screw and nut the frictional contact of the disks can be regulated as desired and to compensate for wear.

The disks 9, with the bolt 10, sleeves 7, and rods 6, constitute a hinge connecting the hame members, each member of the hinge comprising longitudinally-adjustable sections represented by the sleeves 7 and rods 6.

Below sleeves 3 split collars 12 are located on the members 1 and 2 and are securely clamped in position by set-screws 13, having openings in their heads to receive the rein-guide rings 14, and below the rein-guides sleeves 15 are clamped on the members 1 and 2 by set-screws 16 and are made with slotted extensions 17 to receive the back-straps of the harness.

The collar (not shown) is secured to the hame members by means of bolts 18 and nuts 19, carried by split collars 20, secured on the members 1 and 2 by set-screws 21.

To the members 1 and 2 our improved draft-clips 22 are secured, and each of which comprises a sheet of metal bent at one end around the tubular hame member and securely clamped thereon by a screw or screws 23 and nuts 24, and the long end of the plate projects from the hame and is made with outwardly-bent ears 25, connected by a bolt 26, passed through alined openings in the ears and secured in place by a nut. On this bolt between the ears a tube 26$^a$ is located around which the trace is to be secured, and below these clips 22 snap-hooks 28 are pivotally connected with clamping-rings 29 on the hame members and serve to temporarily hold the reins in position to be quickly drawn therefrom and secured to the bit.

On one of the hame members a sleeve 30 is securely clamped and provides a pivotal mounting for an elliptical ring 31 to receive the pole-strap, and the lower ends of said hame members have secured therein downwardly-bent lugs 32, flattened at their lower ends and made with central openings, and alining flattened portions of lugs 33 are also perforated to receive set-screws 34 and securely clamp them together, yet permit of the desired adjustment to exactly position the parts of our improved locking mechanism now to be described. The lugs 33 are screw-threaded, one of which enters a threaded socket in a plug 35 and has a clamping-nut 35$^a$ thereon, and said plug is made with a conical free end 36 and has an annular groove 37 behind the head to receive the locking-dog 41, hereinafter described. The other lug 33 enters the threaded end of a lock-casing 38, having a depending hollow extension 39, into which a ring 40, enlarged and milled at its outer end, is screwed and carries a spring-pressed beveled locking-dog 41, on the outer end of which a ring 42 is mounted to operate the same. A clamping-nut 43 is located on the plug and screwed against casing 38 to firmly clamp the same when once adjusted. When the plug 35 enters casing 38, its conical end 36 will force back dog 41, and the latter will spring into groove 37 and securely lock the hame members together until the dog is drawn out of locking position by ring 42, when the hame members can be readily separated.

The plug 35 is enlarged and shouldered to snugly fit against the end of casing 38 and form, in effect, a continuation thereof, giving to the lock a neat and attractive appearance. Ornamental plugs 44 are screwed into the upper ends of the members 1 and 2, and the latter and all parts above described are preferably nickel-plated to add to its appearance and wearing qualities, With our improvements all of the several attachments are secured in place by clamping on the hame members, and the tubes are free from perforations of any kind which would tend to weaken the same. In fact the attachments tend to strengthen the hame, and we secure the maximum strength for a given quantity of metal. All of the parts are adjustable, and the hame may be made any weight consistent with strength.

The adjacent faces of disks 9 are made with circular grooves to receive a hard-metal ring 9ª to take up wear and prevent injury to the bolt and all of the set-screws instead of being made angular are provided with rounded heads having openings therein, so that they may be adjusted by means of a nail or like handy tool.

In constructing hames from tubular material stock it makes it possible to apply all attachments with the friction-grip principle, which does not dent or mar the gripping parts, making it easy to release and adjust the parts without using set-screws, pins, washer, or rivets. The attachments so constructed have no right or left, making the hame easy to keep in repair, and in case of accident to members 1 and 2 all attachments can be stripped from hame-sticks and new ones put on by unskilled labor without use of tools in five to ten minutes.

Heretofore all draft-clips have been a fixed or stationary attachment, and the only adjustment, which was very little, was made by changing clevis from one pin-hole to another, hardly changing over three-fourths to one inch all told. The friction-grip principle gives a range of six to ten inches, if necessary, and being made from one piece of steel with wide extended base fitted to the collar prevents the tugs from cutting through the collar and places the draft where you get the best results.

The hames can be made as light as two and three-fourths pounds and will have sufficient strength for use with a two-seated carriage. Thus our invention is adaptable for general use, as well as with fire-department harness.

The drop-hinge or curved lug at bottom of hame members is for the purpose of keeping male and female part of locking device in alinement. Should the hames be adjusted to make them narrower or wider, longer or shorter, these lugs will keep the lock in line. Should a hame-stick get bent or twisted by releasing-grips at the top and bottom, the hame can be shifted, so it will lock without making repairs for time being. By using all eyebolts instead of hexagon-head screws for grips a bail or punch is all the tools needed to adjust the hame.

The back-strap attachments being adjustable, it can be shifted to throw the strain where it will fit the hame best. Same rule applies to the pole-straps. On fire-apparatus rigs this is quite important, as they are roughly handled in passing over street-car tracks and have to be coupled close and shifted higher up on the hame.

The snap-holders are made adjustable, so they can be set at the most convenient point to make a quick hitch.

Various slight changes might be made in the general form and arrangement of the parts described without departing from our invention, and hence we do not restrict ourselves to the precise details set forth, but consider ourselves at liberty to make such slight changes and alterations as fairly fall within the spirit and scope of our invention.

Having fully described our invention, what we claim as new, and desire to secure by Letters Patent, is—

1. A hame, comprising two curved tubular members, sleeves adjustably clamped on said members near one end and made with integral inclined hollow lugs, rods or bars secured in said lugs, sleeves clamped on said rods or bars, disk-like extensions on said last-mentioned sleeves located side by side, a screw and nut hinging said disk-like extensions together, and locking means at the other end of said hame.

2. The combination with hame members, of a hinge, each member of said hinge comprising longitudinally-adjustable sections, means for securing said sections together when adjusted, and sleeves clamped to the hame members and having sockets to receive the outer sections of the hinge members.

3. The combination with hame members and sleeves clamped thereto and having sockets, of a hinge, provided with a clamp on each member thereof, and rods constituting extensions of the hinge members and mounted in the sockets of said sleeves and adjustably secured in said clamps.

In testimony whereof we have signed this specification in the presence of two subscribing witnesses.

CLARENCE. A. ADAMS.
HORACE CLEMENT.

Witnesses:
HERBERT GARDNER,
WM. W. EDDY.